United States Patent Office 3,707,577
Patented Dec. 26, 1972

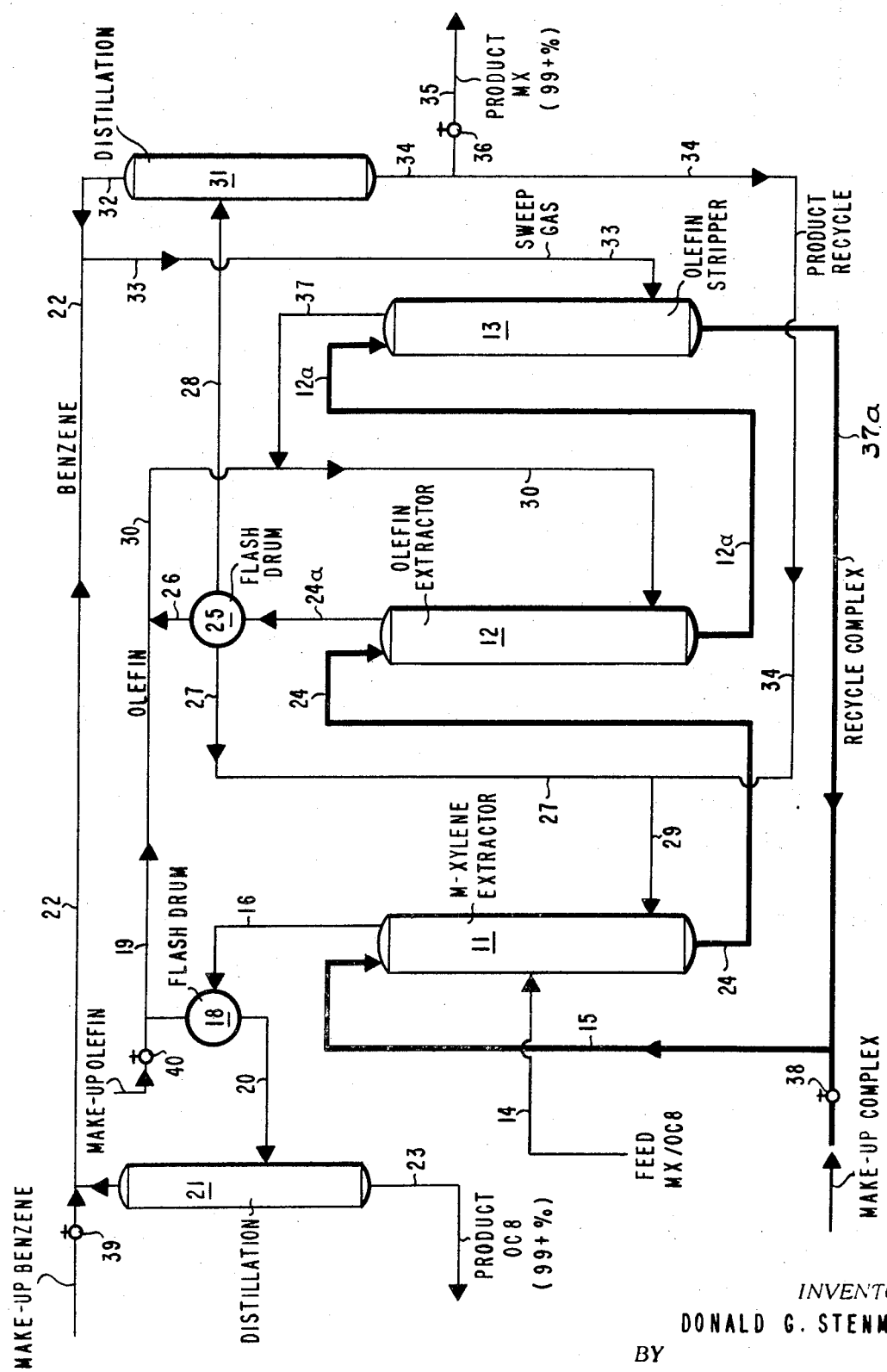

3,707,577
SEPARATION OF AROMATICS
Donald G. Stenmark, Houston, Tex., assignor to Esso Research and Engineering Company
Filed Mar. 8, 1971, Ser. No. 122,073
Int. Cl. C07c 7/02, 7/10
U.S. Cl. 260—674 A                  20 Claims

ABSTRACT OF THE DISCLOSURE

A selected aromatic hydrocarbon is separated from its mixtures with other aromatic hydrocarbons by forming a lithium-aluminum chloride complex with an unsaturated compound which is used to extract a mixture of aromatic hydrocarbons to form a raffinate phase and an extract complex phase; the phases are separated and the extract complex phase is washed with a portion of the compound and there is recovered from the washed extract complex phase a second extract phase lean in said compound and a second raffinate phase comprising said compound and a selected aromatic hydrocarbon which is then recovered from the second raffinate phase.

BACKGROUND OF THE INVENTION

(1) Field of the invention

The present invention is directed to a method of separating a selected aromatic hydrocarbon from its mixtures with other aromatic hydrocarbons. More particularly the invention is concerned with separating a selected aromatic hydrocarbon from its isomeric mixtures. In its more specific aspects the invention is concerned with separation of a mixture of mono-cyclic aromatic hydrocarbons by selectively complexing the more basic aromatic hydrocarbon to form part of a ternary addition compound with lithium and aluminum chlorides, with the less basic aromatic hydrocarbons in the mixture being displaced to an upper phase in a two-liquid phase system by a different aromatic hydrocarbon wash oil. The complex is decomposed by ligand exchange with an olefinic hydrocarbon to form a complex therewith and simultaneously displacing the more basic aromatic hydrocarbon by countercurrent extraction with the different aromatic hydrocarbon.

(2) Description of the prior art

It has been known in the prior art to separate alkyl aromatic hydrocarbons with an aluminum halide and a Group I or II metal halide as disclosed in the patent to Scott et al., U.S. 2,810,022. However, in the Scott et al. patent it is necessary to carry out the invention at a temperature below that at which isomerization occurs and is also necessary to employ a normal paraffin in decomposition of the raffinate phase to obtain the desired aromatic hydrocarbon. It is also known in the prior art that ternary addition compounds of the general formula of the complex employed in the present invention exists. The prior art also teaches the extraction of aromatics with aluminum halide-aromatic complexes, as set out in U.S. 2,481,843. However, none of the prior art teaches a process as disclosed and claimed here wherein lithium-aluminum chloride complexes are used and wherein it is unnecessary to employ a paraffin as a decomplexing agent.

Furthermore, in some of the prior art it is necessary to use hydrogen chloride as part of the complex, which in the present invention is unnecessary. Compared to the HCl-containing complexes, the present invention allows the obtaining of unobvious results in that less unwanted side reactions occur and the lower miscibility between the complex and aromatics significantly lowers the amount of distillation necessary in obtaining purified aromatics and the lower molecular weight of the complex doubles the recovery of certain aromatic hydrocarbon compounds such as metaxylene for the same molar conversion.

The present invention may be briefly described and summarized as involving a method, in the separation of aromatic hydrocarbons by double solvent extraction, of selective complexing of the more basic aromatic hydrocarbon of an aromatic hydrocarbon mixture such as metaxylene from its mixtures with other $C_8$ aromatic hydrocarbons as part of a ternary addition compound with lithium-chloride and aluminum chloride, with the displacement of the other, less basic aromatics to the upper phase in a two-liquid phase system by countercurrent flow of a different aromatic hydrocarbon wash oil which may be a lighter aromatic hydrocarbon wash oil such as benzene. The more basic aromatic hydrocarbon is decomplexed by ligand exchange with an olefin or the like and simultaneously displaced by countercurrent extraction with the different aromatic hydrocarbon wash oil. Regeneration of the olefin complex is accomplished at higher temperatures and at a reduced olefin partial pressure which may be obtained by sweeping or stripping with the light aromatic hydrocarbon. The final separations of the light aromatic hydrocarbon product mixtures may be achieved by distillation, and the light aromatic hydrocarbons, the light aromatic hydrocarbon saturated lithium-aluminum chloride complex, and the olefins are recycled.

VARIABLES OF THE INVENTION

In the practice of the present invention the preferred type of complexable ligand is an unsaturated compound which may be CO, ethylene, propylene or mixtures thereof; for example, methylacetylene, propylene, ethylene, acetylene, the diolefins such as allene and its homologues, as well as the aromatics may be used as the unsaturated compound. Other olefins such as butenes, pentenes, hexenes, heptenes and the like having 2 to 10 carbon atoms in the molecule and the alkyl substituents or mixtures of the olefins may be employed. Specifically, the mono-, di- and tri-olefins may be used such as dienes and homologues thereof. Likewise the monocyclic aromatic hydrocarbons and the alkyl substituents thereof and mixtures of the aromatic hydrocarbons may be employed in the complex. As examples of the monocyclic aromatic hydrocarbons may be mentioned benzene, toluene, xylene, durene, isodurene, prehnitene and the like may be used. In each instance the alkyl substituents may have from 1 to 4 carbon atoms.

The olefin form of the complex is $(olefin)_2 \cdot LiCl \cdot AlCl_3$, while the aromatic form of the complex is

Aromatic·$LiCl \cdot AlCl_3$

In the practice of the present invention the most basic feed component is preferentially complexed by ligand exchange with the complex containing a less basic aromatic ligand in one extraction tower, and a second ligand exchange between an olefin and the complex containing the most basic feed component is conducted in another extraction tower; whereas the complex containing the olefin ligand is decomposed or regenerated in a third extraction tower.

Thus, in the present invention the following temperatures and pressures may be employed in a 3-zone system, employing an aromatic extractor and olefin extractor and an olefin stripper:

|  | Preferred | Range |
|---|---|---|
| (a) Aromatic extractor: | | |
| Pressure | 1.3 atmospheres absolute | 1 to 5 atmospheres absolute. |
| Temperature | 35° F | −20° F. to 160° F. |
| (b) Olefin extractor: | | |
| Pressure | 10 atmospheres absolute | 0.2 to 40 atmospheres absolute. |
| Temperature | 120° F | 0° F to 200° F. |
| (c) Olefin stripper: | | |
| Pressure | 1.3 atmospheres absolute | 0.01 to 2 atmospheres absolute. |
| Temperature | 200° F | 35° F to 300° F. |

In the first two columns they may be regarded as mass transfer limited and not kinetic limited, but the following v./v./hr. may be employed in the first column where metaxylene is used: 1 to 20 lbs. of feed metaxylene per lb. of complex per hour. In the second tower 2 to 10 lbs. of olefin per lb. of complex per lb. per hour.

The following table gives the stream ratios which may be employed:

|  | Complexable arom. feed component per complex (mol/mol) | Complexable olefin feed component per complex¹ (mol/mol) | Wash oil per complex (lb./lb.) | Sweep vapor per complex (lb./lb.) |
|---|---|---|---|---|
| Range | 0.2–1.2 | 0.4–2.4 | 0.1–1.0 | 0.5–5.0 |
| Preferred | 0.7 | 1.4 | 0.3 | 2.0 |

¹ In the case where the olefin is totally recycled to the olefin-to-complex ratio may be in large excess, say up to 10 mol/mol, to enhance recomplexing.

The several complexes employed in the present invention and used in comparison may be made up in accordance with the following methods:

Method I: Formation of Li(AlCl₄) is achieved by fusing LiCl and 0.55 Al₂Cl₆ together in a tube at about 400° F. for about 2 hours, during which time the excess and unreacted Al₂Cl₆ is removed by sublimation. The solid Li(AlCl₄) is then shaken with aromatics to form a clear amber liquid complex phase comprised of $$\text{aromatic} \cdot \text{LiCl}_3 \cdot \text{AlCl}_3$$

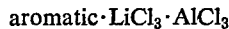

complex plus dissolved aromatics. The dissolved aromatics will be typically 0.25 to 0.30 lb. per lb.

$$\text{aromatic} \cdot \text{LiCl}_3 \cdot \text{AlCl}_3$$

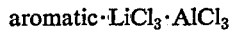

but may range in saturation limits between 0.1 to 0.5 lb./lb.

Method II: Direct formation of benzene·LiCl·AlCl₃ complex is achieved by shaking 1.1 LiCl plus 0.5 Al₂Cl₆ for 18 hours (12–24 hours) at room temperature (60°–90° F.) with 1.0 to 3.0 moles aromatics (e.g., benzene). Unreacted LiCl remains as a solid and may be removed by filtration or by decantation. The heavy, complex phase is a clear amber liquid, and any excess aromatic will remain as a light, upper phase which may be removed by decanting.

Method III: LiCl plus ½ (aromatic·HCl·Al₂Cl₆) complex plus 0.5 to 3 moles aromatic are shaken in a flask at room temperature or at elevated temperatures (190° F.) from one to six hours. HCl is evolved and the remaining heavy, aromatic·LiCl·AlCl₃ complex phase is separated from the excess aromatics by decanting.

The feedstocks to the present invention which may be subject to separation ordinarily are the isomeric mixtures of C₈ to C₂₀ alkyl substituted benzenes, such as the xylenes, meta-, ortho-, and paraxylenes and ethylbenzene and the like, the polyalkyl substituted naphthalenes such as 1,4-dimethyl-, 2,3-dimethyl-, 1,2,5-trimethyl-, 1,2,6-trimethyl-, and 1,2,7-trimethyl naphthalene or mixtures thereof. Preferred feed streams are the C₈ to C₁₂ monocyclic alkyl substituted benzenes, preferably C₈ to C₁₀ and more preferably C₈ to C₉ isomeric alkyl substituted benzenes and mixtures thereof.

The present invention is not limited to separation of one isomer from another but other aromatics of different molecular weight may be separated from each other. For example, a C₈ to C₉ aromatic hydrocarbon feed may be separated into a C₈-rich aromatic hydrocarbon fraction and a C₉-rich aromatic hydrocarbon mixture, the C₉ aromatic hydrocarbons being the more strongly complexable species.

In the practice of the present invention the complexed aromatic hydrocarbon in the recycle aromatic·LiCl·AlCl₃ complex phase should be of lower molecular weight (i.e., a weaker complexable ligand) than the feed aromatic hydrocarbon to be separated. In the case of a C₈ aromatic hydrocarbon made up of isomers, where metaxylene is to be separated, toluene or benzene is preferably used. This lower molecular weight hydrocarbon is also the same component used as both the wash-oil and sweep vapor, since its lower boiling point affords final product separation by simple distillation.

BRIEF DESCRIPTION OF THE DRAWING

The present invention will be further illustrated by reference to the single figure which is a flow diagram of a preferred mode.

BRIEF DESCRIPTION OF THE DRAWING WITH RESPECT TO THE PREFERRED EMBODIMENT AND MODE

Referring now to the drawing, and particularly to the Insole figure numerals 11, 12 and 13 designate respectively a metaxylene extractor, an olefin extractor, and an olefin stripper or zones. Each one of these several zones may be equipped internally with suitable contacting means for insuring intimate contact between the various components which are introduced thereto. Such equipment may be contacting equipment such as bellcap trays, various packings and the like.

Introduced into zone 11 by way of line 14 may be a feed mixture comprising metaxylene (MX) and other isomers (OC8), such as orthoxylene having 8 carbon atoms in the molecule. The feed mixture contacts in zone 11, a complex introduced by line 15 which flows countercurrent to the feed such that as a separation is made between a raffinate phase containing the C₈ aromatic hydrocarbons other than metaxylene, such as orthoxylene, which is withdrawn by line 16 and introduced into a flash zone 18 and separated at a suitable temperature and pressure to remove olefins, which in this example may be ethylene, which are withdrawn by line 19. The other C₈ aromatic hydrocarbons are discharged by line 20 into a distillation zone 21 which is provided with an auxiliary internal contacting means and also with heating means to allow separation between the light aromatic hydrocarbons, such as benzene, which is used in making up the complex. The benzene is withdrawn as vapors by line 22, while the product as a liquid phase comprising the other xylenes is withdrawn by line 23.

There is formed in zone 11 a metaxylene-rich extract with the complex, and this is discharged by line 24 which leads into olefin extractor 12 which is similarly equipped to extractor 11. By suitable adjustment of temperatures and pressures, a stream is withdrawn overhead by line 24a and flashed in drum 25 to remove olefins by line 26 and a mixture of metaxylene and benzene by line 27 and metaxylene-rich raffinate by line 28. The mixture withdrawn by line 27 is recycled to extractor 11 by line 29 in admixture with additional recycle from line 34 as will be described further. The olefins flashed from drums 18 and 25 are discharged into line 30 and introduced thereby into the olefin extractor 12 where they are condensed under the conditions and pressures prevailing therein and contact the metaxylene-rich extract. By ligand exchange the olefins replace the metaxylene, forming a metaxylene-rich raffinate, which is removed by line 24a into drum 25 wherein the olefins are flashed off, and then removed by line 28 into the distillation tower 31, which is suitably equipped with internal contacting means and heating means to allow removal by line 32 of benzene, which is recycled in admixture with benzene from line 22 by line 33 in a vaporous condition to the suitably equipped olefin stripper 13. Metaxylene-lean extract is discharged from zone 12 by line 12a into zone 13.

Product metaxylene is withdrawn from distillation tower 31 by line 34 and may be discharged by branch line 35 controlled by valve 36, and recycled in part by line 34 in admixture with the stream in line 27 forming line 29.

Benzene and olefin are removed from zone 13 by line 37 and admixed with the wash-oil olefin in line 30 for admission into zone 12.

The recycled complex lean in metaxylene is discharged from zone 13 by line 37a and introduced into line 15, which discharges into zone or extractor 11. Make-up complex may be introduced by opening valve 38 in line 37a or excess complex may be discharged thereby.

Likewise, make-up benzene may be introduced by opening valve 39 in line 22 or excess benzene may be discharged thereby, and make-up olefin may be introduced by opening valve 40 in line 19 or excess olefin may be discharged thereby.

A material balance around the drawing is shown in the following table:

lene and complex regeneration. The present invention is, therefore, quite advantageous, useful and unobvious.

The nature and objects of the present invention having been completely described and illustrated and the best mode contemplated set forth what I wish to claim as new and useful and secure by Letters Patent is:

What is claimed is:

1. A method of separating a selected aromatic hydrocarbon from a mixture with other aromatic hydrocarbons which comprises forming a first complex of lithium chloride, aluminum chloride, and selected aromatic hydrocarbon, removing the other aromatic hydrocarbons from the mixture by a first countercurrent extraction with an aromatic hydrocarbon wash oil of a lower boiling point than the components of said aromatic hydrocarbon mixture to be separated to form a first raffinate, lean in the selected aromatic hydrocarbon and rich in the other aromatic hydrocarbons and a first extract containing the complex, rich in the selected aromatic, separating said phases, subjecting the first extract to a second countercurrent extraction with said wash oil in admixture with a ligand compound selected from the group consisting of carbon monoxide, the mono-, di-, and tri-olefins having 2 to 10 carbon atoms in the molecule whereby ligand exchange occurs between the complexed selected aromatic and the ligand compound, thereby forming a second raffinate, rich in the selected aromatic, and a second extract containing a second complex, lean in the selected aromatic and rich in the said ligand compound, removing the second complex and contacting it with vaporous wash oil to form a third raffinate, rich in the said ligand compound, and a third extract containing a complex, lean in the ligand compound and rich in said wash oil, and re-

|  | Line designation | | | | | | | | |
|---|---|---|---|---|---|---|---|---|---|
|  | 14 | 15 | 24 | 29 | 16 | 33 | 24a | 28 | 12a |
| Olefin | | (4) | (4) | | | | | | (28) |
| Benzene | | 42 | 18 | 20 | 44 | 287 | 263 | 243 | 37 |
| Other C$_8$, "OC8" | 60 | | <1 | ≪1 | 60 | | <1 | <1 | |
| Metaxylene, "MX" | 40 | (5) | 65 | 20 | <1 | | 60 | 55 | (5) |
| LiCl·AlCl$_3$ | | (85) | (85) | | | | | | (85) |
| Total weight | 100 | 136 | 172 | 40 | 104 | 287 | 323 | 299 | 155 |

Note.—Complexed portion in parentheses.

In order to illustrate the present invention further and to point out specifically the advantages thereof, a comparison is shown in the following table between the complex used in the present invention and the complex of the prior art; specifically, one containing hydrogen chloride. In the table the parenthetical letters correspond to the stream designation in the several lines of the drawing.

|  | Complexing agent | | |
|---|---|---|---|
|  | Mesitylene·HCl·Al$_2$Cl$_6$ | | Benzene·LiCl·AlCl$_3$ |
|  | 35° F. | −10° F. | 35° F. |
| Process streams recycle complex (15) | 645 | 380 | 135 |
| MX-rich extract (24) | 730 | 460 | 170 |
| Complexing column wash oil (29) | 405 | 250 | 40 |
| OC8-rich raffinate to distillation (20) | 410 | 260 | 105 |
| Decomplexing column wash oil (33) | 395 | 235 | 285 |
| MX-rich raffinate to distillation (28) | 115 | 100 | 300 |

This is a material balance comparison on the basis of 100 lbs. for a 40:60 ratio of metaxylene:other C$_8$ aromatic feedstock, with all stream sizes given in lbs.

It will be noted immediately from a comparison between the third column and the first and second columns that the present invention allows a marked reduction in recycle streams and also allows recovery the metaxycovering said selected aromatic hydrocarbon from the second raffinate.

2. A method in accordance with claim 1 in which the mixture of aromatic hydrocarbons is selected from the group consisting of C$_8$-C$_{20}$ alkyl substituted benzenes, alkyl substituted naphthalenes, and mixtures thereof, wherein in each instance the alkyl substituents have from 1 to 4 carbon atoms.

3. A method in accordance with claim 1 in which the mixture of aromatic hydrocarbons is an isomeric mixture.

4. A method in accordance with claim 1 in which the mixture of aromatic hydrocarbons is a mixture of aromatic hydrocarbons of different molecular weights.

5. A method in accordance with claim 1 in which the selected aromatic hydrocarbon is recovered from the second raffinate by distillation.

6. A method in accordance with claim 1 in which the aromatic mixture, which is lean in the selected aromatic hydrocarbon, is recovered from the first raffinate by distillation.

7. A method in accordance with claim 1 in which the wash oil employed for removing the other aromatic hydrocarbons in the first extraction operation comprises said selected aromatic hydrocarbon in admixture with the lower boiling point aromatic hydrocarbon.

8. A method in accordance with claim 7 in which a portion of the said wash oil mixture employed in the first extraction is obtained directly from the second raffinate phase, rich in the selected aromatic and in which the ligand compound is first removed by flashing.

9. A method in accordance with claim 1 in which a portion of the wash oil mixture employed in the second extraction is obtained from the third raffinate phase which is rich in the ligand compound.

10. A method in accordance with claim 1 in which the mixture of aromatic hydrocarbons comprises ethylbenzene, para-, meta-, and orthoxylene, wherein the selected aromatic is metaxylene, and the lower boiling point aromatic hydrocarbon is benzene, toluene or a mixture thereof, and the ligand compound is ethylene, propylene or a mixture thereof.

11. A method in accordance with claim 1 in which the third extract is employed as a recycle complex for complexing the selected aromatic hydrocarbon in the first extraction and ligand exchange occurs between the ligand of the said recycle complex and the said selected aromatic hydrocarbon.

12. A method in accordance with claim 11 in which the ligand in the recycle complex of the said third extract phase consists primarily of the said lower boiling point aromatic wash oil.

13. A method in accordance with claim 1 in which the first complex is first formed by agitating aluminum chloride, lithium chloride, and benzene in the mole ratio of 1.0/1.1/3.0 for about 12 to about 24 hours at a temperature of about 60° F. to 90° F. and recovering the complex as a clear amber, heavy liquid containing the benzene·LiCl·AlCl$_3$ complex in the component mole ratio of 1.0/1.0/1.0 plus excess dissolved benzene in the ratio of 0.1 to 0.5 lb. per lb. benzene·LiCl·AlCl$_3$.

14. A method in accordance with claim 1 in which the first extraction operation is performed at a pressure from about 1 to about 5 atmospheres absolute and at a temperature from about −20° to about 160° F.

15. A method in accordance with claim 1 in which the second extraction operation is performed at a pressure from about 0.2 to about 40 atmospheres absolute and at a temperature from about 0° to about 200° F.

16. A method in accordance with claim 1 in which the second extract phase is decomposed to form a recycle complex by subjecting the second extract phase to a pressure from about 0.01 to about 2 atmospheres absolute and at a temperature of about 35° F. to about 300° F.

17. In the separation of a mixture of mono-cyclic aromatic hydrocarbons, the steps which comprise selectively complexing the more basic aromatic hydrocarbon in the mixture to form part of a ternary addition compound with lithium and aluminum chlorides, displacing the less basic aromatic hydrocarbons in the mixture to an upper phase in a two liquid phase system by a different aromatic hydrocarbon wash oil, decomplexing the more basic aromatic hydrocarbons by ligand exchange with an olefinic hydrocarbon to form a complex therewith and simultaneously displacing the more basic aromatic hydrocarbon by countercurrent extraction with said different aromatic hydrocarbon wash oil.

18. A method in accordance with claim 17 in which the mixture of aromatic hydrocarbons comprise ethylbenzene, para-, meta-, and orthoxylene and the different aromatic hydrocarbon is benzene and the olefinic hydrocarbon, ethylene, propylene, or a mixture thereof.

19. A method in accordance with claim 17 in which the different aromatic hydrocarbon is in a vaporous form when employed to displace the olefinic hydrocarbon from the complex, and is lighter than the components in the aromatic hydrocarbon mixture.

20. In the separation of a mixture of mono-cyclic aromatic hydrocarbons, the steps which comprise selectively complexing the more basic aromatic hydrocarbon in the mixture to form part of a ternary addition compound with lithium and aluminum chlorides, displacing the less basic aromatic hydrocarbons in the mixture to an upper phase in a two liquid phase system by a different aromatic hydrocarbon wash oil, decomplexing the more basic aromatic hydrocarbons by ligand exchange with a ligand compound selected from the group consisting of carbon monoxide, the mono-, di-, and tri-olefins having 2 to 10 carbon atoms in the molecule to form a complex therewith and simultaneously displacing the more basic aromatic hydrocarbon by countercurrent extraction with said different aromatic hydrocarbon wash oil.

References Cited
UNITED STATES PATENTS

| | | | |
|---|---|---|---|
| 2,810,002 | 10/1957 | Scott et al. | 260—674 |
| 3,440,296 | 4/1969 | Walker | 260—674 |
| 3,467,725 | 9/1969 | Walker | 260—674 |

DELBERT E. GANTZ, Primary Examiner

C. E. SPRESSER, Jr., Assistant Examiner

U.S. Cl. X.R.

260—674 SE, 674 N